United States Patent

[11] 3,632,275

| [72] | Inventor | Howard R. Misner |
| | | Rochester, Mich. |
| [21] | Appl. No. | 60,486 |
| [22] | Filed | Aug. 3, 1970 |
| [45] | Patented | Jan. 4, 1972 |
| [73] | Assignee | Ford Motor Company |
| | | Dearborn, Mich. |

[54] APPARATUS FOR FORMING A BEND IN SHEET MATERIAL
5 Claims, 4 Drawing Figs.

[52] U.S. Cl. ................................................. 425/405,
264/92, 425/423
[51] Int. Cl. ......................................................... B29c 17/04,
B29c 23/00
[50] Field of Search ........................................ 18/19 R, 19
F, 19 BM, 19 BE, 19 BC, 19 A, 35, DIG. 58;
264/90–92

[56] References Cited
UNITED STATES PATENTS

| 2,784,455 | 3/1957 | Pulaski | 18/DIG. 58 |
| 3,437,025 | 4/1969 | Rice | 18/DIG. 58 |
| 3,467,741 | 9/1969 | Kesling | 18/19 F X |
| 3,540,079 | 11/1970 | Bush | 18/19 A |
| 3,577,593 | 5/1971 | Jackson | 18/19 F |

*Primary Examiner*—Robert L. Spicer, Jr.
*Attorneys*—John R. Faulkner and William E. Johnson

ABSTRACT: The apparatus is utilized in conjunction with a vacuum forming system to place a reverse bend in a plastic sheet. The apparatus includes a base, a stationary mold member and a movable mold member. The two mold members, in an associated position, define therebetween the reverse bend to which the plastic sheet is to be formed. The movable mold member is biased to a first position remote from the stationary mold member. The movable mold member has a gripping surface thereon which grips the plastic sheet to be formed. When the movable mold member moves to a second position associated with the stationary mold member, a portion of the plastic sheet is carried by the gripping surface between the two mold members thereby to be formed into the reverse bend.

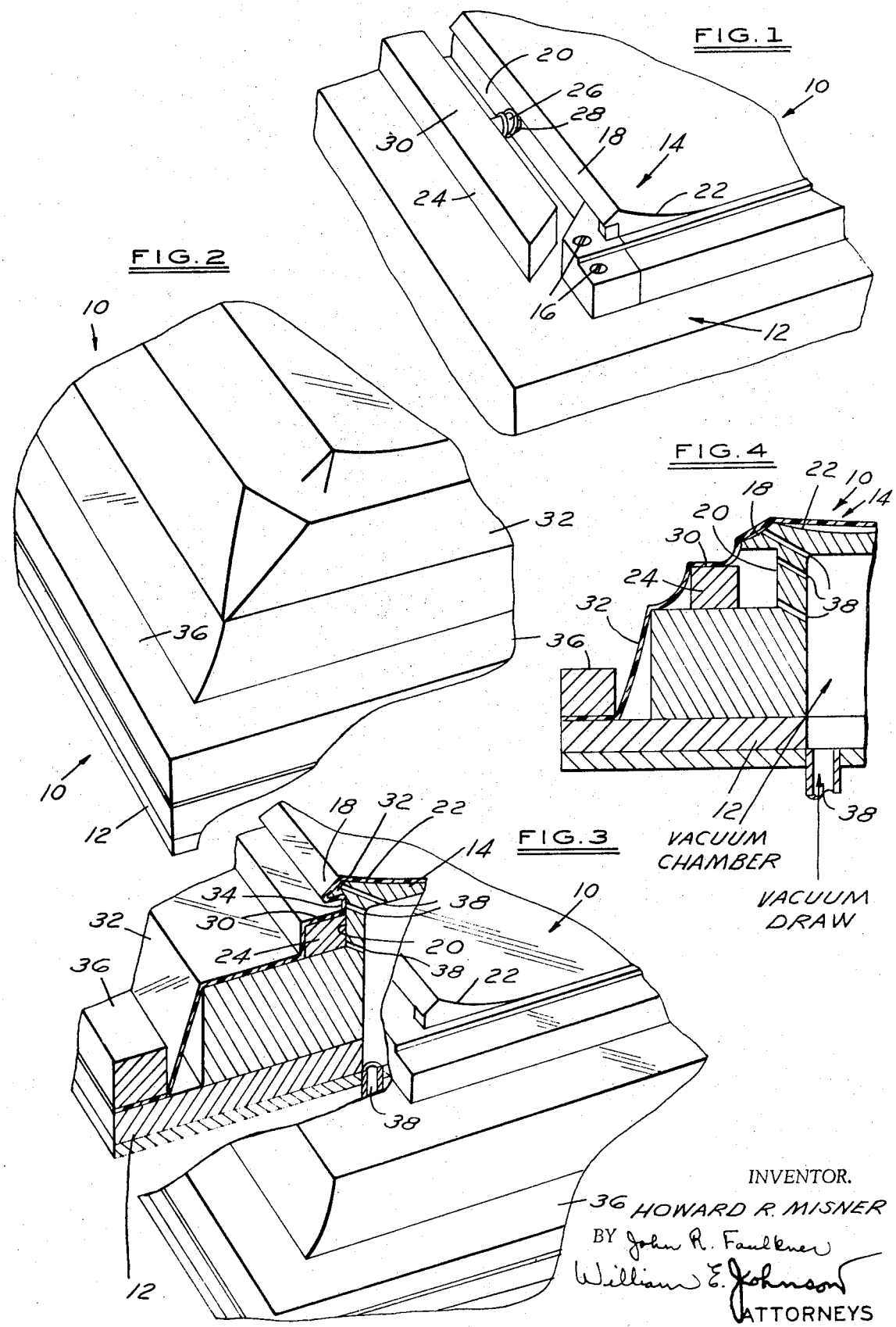

3,632,275

APPARATUS FOR FORMING A BEND IN SHEET MATERIAL

BACKGROUND OF THE INVENTION

Forming a reverse bend in a plastic sheet is a difficult operation. Generally the difficulties involved in forming the sheet in such a manner are caused during the drawing of the sheet into a mold which defines the reverse bend configuration. The drawn sheet tends to have the thickness thereof reduced in the vicinity of the draw so that the sheet may be either torn or ruptured rather easily at this position when subsequently utilized as an article of commerce.

The apparatus of this invention has been designed to eliminate the thinning of wall sections during the molding of sheets of plastic material into reverse bend configurations. The apparatus of this invention also permits the molding of intricately shaped, reverse bend configurations in plastic sheets without the disadvantages of wall thinning in the vicinity of the reverse bend configuration. By eliminating the thinning of wall sections in such a configuration, the amount of subsequent scrappage of such articles is substantially reduced.

SUMMARY OF THE INVENTION

This invention relates to apparatus for use in forming a sheet to a final configuration in which it has a bend formed therein and, more particularly, to apparatus for use in conjunction with a vacuum system for forming a plastic sheet to a final configuration in which the sheet has a reverse bend formed therein.

In accordance with the teachings of this invention, the apparatus for forming a plastic sheet includes a base and a stationary mold member secured to the base. This mold member defines a portion of the reverse bend to which the sheet of plastic is to be formed. A movable mold member defines another portion of the reverse bend to which the sheet of plastic is to be formed. The movable mold member is mounted on the base for movement between first and second positions. The movable mold member is remote from the stationary mold member when in its first position and is in juxtaposition to the stationary mold member when in its second position. When the movable mold member is in its second position, the mold members define therebetween the reverse bend to which the plastic sheet is to be formed. The movable mold member is biased to its first position with respect to the stationary mold member by a spring arrangement. A gripping surface is formed on the movable mold member for holding the plastic sheet on the movable mold member as that member is moved relative to the stationary mold member. As the movable mold member is moved toward the stationary mold member, the plastic sheet is formed into the reverse bend between the two mold members. A clamping element is cooperable with the base and the two mold members for clamping the plastic sheet in sealing association with the base and the mold members so that a vacuum may be drawn on the interior of the plastic sheet. The drawing of a vacuum on the interior of the plastic sheet causes the exterior air pressure to act on the spring arrangement associated with movable mold members whereby the movable mold member moves to its second position. The movement of this member to its second position forms the reverse bend in the plastic sheet. Prior to forming the plastic sheet in the apparatus, the plastic sheet must be heated to a temperature wherein the plastic material is pliable and in a formable condition.

In greater detail, the gripping surface formed on the movable mold member of the apparatus of this invention is in the form of a roughened surface. In the preferred embodiment, the roughened surface should have a surface finish with a roughness of at least 250 microinches.

BRIEF DESCRIPTION OF THE DRAWINGS

FIG. 1 is a perspective view of the apparatus of this invention for forming a plastic sheet.

FIG. 2 is a perspective view showing the apparatus of this invention with a plastic sheet placed thereon for formation into the reverse bend configuration.

FIG. 3 is a perspective view, having a portion thereof cutaway, showing details of the apparatus of this invention after a plastic sheet has been formed to a reverse bend configuration.

FIG. 4 is a cross section view taken along line 4—4 of FIG. 2.

DESCRIPTION OF THE PREFERRED EMBODIMENT

Construction

Reference is made to FIG. 1 of the drawings in which the apparatus for forming a bend in a plastic sheet constructed in accordance with the teachings of this invention is shown and generally identified by the number 10. The apparatus includes a base 12 which supports thereon a stationary mold member identified generally by the numeral 14. The stationary mold member 12 secured to the base by the utilization of suitable fasteners 16 (FIG. 1) or cast as one piece.

The stationary mold member 14 has a leading edge portion 18 and a undercut surface portion 20. The mold member 14 also has an upper forming surface 22, which together with the undercut surface portion and the leading edge portion of the mold member, aids in forming a plastic sheet to a desired configuration.

A movable mold member 24 is supported for sliding movement along the base 12 toward the stationary mold member 14. The moveable mold member is guided in its movement by means of a locating shaft 26 which is received in an opening (not shown) in the member 24. The other end of the locating shaft 26 is received in a suitable opening (not shown) in the undercut surface portion 20 of the stationary mold member. A spring 28 acts between the undercut surface portion of the stationary mold member and the movable mold member so as to bias the movable mold member to a first or normal position as shown in FIG. 1. When sufficient pressure is applied to the movable mold member to collapse the spring, this member moves to a second position in engagement with the undercut surface portion 20 of the stationary mold member as is shown in FIG. 3.

In accordance with the teachings of this invention an upper surface 30 of the movable mold member 24 is a roughened surface. For example, the mold member 24 may be formed from wood to provide the necessary rough surface thereon. In an alternative form, the movable mold member may be formed from cast aluminum having a minimum surface finish on the upper surface with a surface roughness of at least 250 microinches as measured on the profilometer scale. The necessity for forming a roughened surface on the movable mold member will be explained in greater detail in a subsequent portion of this specification.

When it is desired to form a plastic sheet 32 to a final configuration having a reverse bend 34 (FIG. 3) formed therein, the plastic sheet is preclamped in the frame 36 and must be preheated to a temperature of approximately 350° F. if the plastic material is Acrlonitrile-Butadiene-Styrene (A.B.S.). Once the plastic sheet 32 is heated to the proper temperature it partially drapes over the stationary mold member 14, the movable mold member 24 and the base 12. The frame 36 (FIGS. 2 and 3) clamps the plastic sheet firmly to the base in a sealing relationship. When the plastic sheet is in this condition, the principle portions thereof are overlying the two mold members. A vacuum system 38 (see FIG. 4) is provided which is associated with a suitable intermittently operated vacuum supplying apparatus in order to draw a vacuum between the plastic sheet 34 and the base and mold members of the apparatus 10.

Operation

In accordance with the teaching of this invention the apparatus 10 of this invention is utilized in the following manner to form a plastic sheet to a final configuration in which the sheet has a reverse bend formed therein. A plastic sheet 32 of a material such as Acrylonitrile-Butadiene-Styrene (A.B.S.) is preheated to a temperature of approximately 350° F. The preheating of the sheet softens the same and permits its drawing into the final configuration.

The plastic sheet 32, once clamped in the frame 36 and heated to its proper temperature, becomes partially draped over the stationary mold member 14, the movable mold member 24 and the base 12 as may be seen in FIG. 4. The frame holds the plastic sheet to the base in a sealing relationship. The plastic sheet, clamped in such condition, is illustrated in the drawings in FIGS. 2 and 4 wherein it is seen that the plastic sheet has taken on some of the characteristics of the mold members.

Once the sheet of plastic 32 is clamped in position by the frame 36, a vacuum is drawn through vacuum system 38 (FIG. 4) on the volume between the mold members, the vacuum chamber and the undersurface of the sheet. The portion of the plastic sheet which is resting on the upper surface 30 of the movable mold member 24 is held in position on the movable mold member by the roughness of that surface. During the drawing of the vacuum on the volume between the sheet and the mold members, the portion of the plastic sheet associated with the upper surface 30 of the movable mold member is not moved relative to that surface. However, as the vacuum is drawn on the mentioned volume, the exterior air pressure acts on the plastic sheet and forces the movable mold members 24 from the position shown in FIG. 1 against the bias of the spring 28 to a position shown in FIG. 3 wherein the member is in contact with the undercut surface portion 20 of the stationary mold member 14. During the movable mold members movement the plastic sheet lying on the upper surface 30 thereof is drawn along with the movable mold member and is not moved relative thereto. By such action, this portion of the plastic sheet is forced under the loading edge portion of the stationary mold member 14 and into engagement with the undercut surface portion 20 of that same member so that the reverse bend configuration 34 of the plastic sheet is formed (FIG. 3). The drawing of the portion of the plastic along with the upper surface portion 30 of the movable mold member causes the formation of the reverse bend configuration without a thinning of the plastic material in this area. Thus, the plastic is not weakened in the area of the reverse bend configuration, an area with some criticality because of the stresses which can be applied to that type of configuration to cause damage thereto.

Simultaneously with the movement of the movable mold member 24, as a result of the vacuum being drawn on the apparatus 10, the other areas of the plastic sheet 32 are drawn firmly into engagement with the other molding surfaces of the mold members in order to define the other features of the final molded article. Thus, the final configuration of the plastic sheet is one of a complex nature in that it has a deep, reverse bend has been formed therein.

The plastic sheet is cooled on the apparatus 10 until its temperature is such that the plastic sheet will not be deformed by handling. Once the sheet has cooled sufficiently, the vacuum may be released on the apparatus. Upon release of the vacuum, and upon the subsequent removal of the formed plastic sheet, the apparatus 10 returns to the condition seen in FIG. 1. After the molding apparatus has returned to its initial condition, the apparatus is again ready for use in molding another plastic sheet.

The invention disclosed will have many modifications which will be apparent to those skilled in the art in view of the teachings of this specification. It is intended that all modifications which fall within the true spirit and scope of this invention be included within the scope of the appended claims.

I claim:

1. Apparatus for use in conjunction with a vacuum system for forming a plastic sheet to a final configuration in which the sheet has a reverse bend formed therein, which apparatus comprises:
   a base;
   stationary mold means secured to said base for defining at least a portion of the reverse bend to which the sheet of plastic is to be formed;
   a movable mold means for defining at least another portion of the reverse bend to which the sheet of plastic is to be formed and mounted for movement with respect to said base from a first position to a second position; said movable mold means being remote from said stationary mold means when in its said first position and being in juxtaposition to said stationary mold means when in its second position so that said two mold means define therebetween the reverse bend to which the plastic sheet is to be formed;
   biasing means for moving said movable mold means normally to its said first position;
   gripping means formed on said movable mold means for holding the plastic sheet on said movable mold means as that means is moved relative to said stationary mold means whereby the plastic sheet is formed into the reverse bend shape as said movable mold means is moved to its second position and
   clamping means cooperable with said base and said two mold means for clamping the plastic sheet in sealing association therewith so that a vacuum may be drawn on the interior of the plastic sheet and said movable mold means be moved to its second position against the action of said biasing means thereby forming the reverse bend in the plastic sheet.

2. The apparatus for forming a reverse bend in a plastic sheet as defined in claim 1 wherein: said gripping means formed on said movable mold means is in the form of a roughened surface defining at least a portion of the surface of said movable mold means which defines the reverse bend to which the plastic is to be formed.

3. The apparatus for forming a reverse bend in a plastic sheet as defined in claim 2 wherein: said roughened surface forming said gripping means has a surface finish with a roughness of at least 250 microinches.

4. Apparatus for use in conjunction with a vacuum system for forming a plastic sheet to a final configuration in which the sheet has a reverse bend formed therein, which apparatus comprises:
   a base;
   a stationary mold member secured to said base and defining at least a portion of the reverse bend to which the sheet of plastic is to be formed;
   a movable mold member defining at least another portion of the reverse bend to which the sheet of plastic is to be formed and mounted for movement with respect to said base from a first position to a second position, said movable mold member being remote from said stationary mold member when in its said first position and being in juxtaposition to said stationary mold member when in its second position so that said two mold members define therebetween the reverse bend to which the plastic sheet is to be formed;
   spring means acting between said two mold members for moving said movable mold member normally to its said first position; said spring means being compressed to move said movable mold member to its second position;
   a roughened surface formed on at least a portion of the surface of said movable mold member defining the reverse bend to which the plastic is to be formed, said surface being sufficiently rough to grip a hot plastic sheet when such a sheet is placed thereon; and
   a clamping member cooperable with said base and said two mold members for clamping a plastic sheet in sealing association therewith so that a vacuum may be drawn on the interior of plastic sheet whereby exterior pressure acts against said spring means to compress the same and move said movable mold member to its second position thereby to form the reverse bend in the plastic sheet.

5. The apparatus for forming the reverse bend in a plastic sheet as defined in claim 4 wherein: said roughened surface has a surface finish with a roughness of at least 250 microinches.

* * * * *